United States Patent
Park et al.

(10) Patent No.: US 10,002,412 B2
(45) Date of Patent: Jun. 19, 2018

(54) IMAGE PROCESSING DEVICE THAT REMOVES HAZE FROM IMAGE

(71) Applicant: SAMSUNG ELECTRONICS CO., LTD., Suwon-si, Gyeonggi-do (KR)

(72) Inventors: Rae-Hong Park, Seoul (KR); Dong-Won Jang, Seoul (KR)

(73) Assignees: SAMSUNG ELECTRONICS CO., LTD., Suwon-si, Gyeonggi-Do (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 62 days.

(21) Appl. No.: 15/295,724

(22) Filed: Oct. 17, 2016

(65) Prior Publication Data
US 2017/0109870 A1   Apr. 20, 2017

(30) Foreign Application Priority Data

Oct. 16, 2015  (KR) .................. 10-2015-0144451

(51) Int. Cl.
G06T 5/00  (2006.01)
G06T 5/20  (2006.01)
G06T 5/40  (2006.01)

(52) U.S. Cl.
CPC ............. *G06T 5/003* (2013.01); *G06T 5/20* (2013.01); *G06T 5/40* (2013.01); *G06T 2207/10024* (2013.01)

(58) Field of Classification Search
CPC .. G06T 5/003; G06T 5/20; G06T 5/40; G06T 2207/10024
See application file for complete search history.

(56) References Cited

U.S. PATENT DOCUMENTS

| 8,340,461 B2 * | 12/2012 | Sun .................. G06K 9/40 358/3.26 |
| 8,374,428 B2 * | 2/2013 | Lepikhin .............. H04N 9/735 348/218.1 |
| 8,396,324 B2 | 3/2013 | Kang et al. |

(Continued)

FOREIGN PATENT DOCUMENTS

| CN | 103971337 | 8/2014 |
| KR | 10-1292421 | 8/2013 |

(Continued)

*Primary Examiner* — Ming Hon

(74) *Attorney, Agent, or Firm* — F. Chau & Associates, LLC

(57) ABSTRACT

A device for removing haze from an image includes an image decomposer that decomposes a near-infrared (NIR) image to generate an NIR detail layer image and decomposes an RGB image to generate an RGB detail layer image and an RGB base layer image, a weight generator that generates a mixing weight value based on a similarity between high frequency (HF) components of the NIR image and the RGB image, a detail layer mixer that mixes the NIR detail layer image and the RGB detail layer image based on the mixing weight value to generate a mixed RGB detail layer image, a base layer dehazer that removes haze from the RGB base layer image to generate a compensated RGB base layer image, and an adder that adds the mixed RGB detail layer image and the compensated RGB base layer image to generate an output RGB image.

20 Claims, 10 Drawing Sheets

(56) References Cited

U.S. PATENT DOCUMENTS

| | | | |
|---|---|---|---|
| 8,417,053 B2 | 4/2013 | Chen et al. | |
| 8,837,856 B2 | 9/2014 | Fukunaga | |
| 2011/0052029 A1* | 3/2011 | Connah | G06T 5/50 |
| | | | 382/131 |
| 2011/0311156 A1* | 12/2011 | Seo | G06T 5/008 |
| | | | 382/266 |
| 2013/0250123 A1 | 9/2013 | Zhang et al. | |
| 2015/0060645 A1* | 3/2015 | Shenoy | H04N 9/045 |
| | | | 250/208.1 |
| 2015/0161769 A1 | 6/2015 | Hong et al. | |
| 2016/0019421 A1* | 1/2016 | Feng | G06K 9/00604 |
| | | | 382/117 |
| 2016/0063684 A1* | 3/2016 | Park | G06T 5/003 |
| | | | 348/241 |

FOREIGN PATENT DOCUMENTS

| | | |
|---|---|---|
| KR | 10-1418185 | 7/2014 |
| KR | 10-1470833 | 12/2014 |
| KR | 1020140142381 | 12/2014 |

\* cited by examiner

| G(-2,-2) | G(-1,-2) | G(0,-2) | G(1,-2) | G(2,-2) |
|---|---|---|---|---|
| G(-2,-1) | G(-1,-1) | G(0,-1) | G(1,-1) | G(2,-1) |
| G(-2,0) | G(-1,0) | G(0,0) | G(1,0) | G(2,0) |
| G(-2,1) | G(-1,1) | G(0,1) | G(1,1) | G(2,1) |
| G(-2,2) | G(-1,2) | G(0,2) | G(1,2) | G(2,2) |

FIG. 4

IMG1

| | | | | | | | |
|---|---|---|---|---|---|---|---|
| | | | | | a(x+4,y-3) | a(x+4,y-2) | |
| a(x+3,y-3) | a(x+3,y-2) | a(x+3,y-1) | a(x+3,y) | a(x+3,y+1) | a(x+3,y+2) | a(x+3,y+3) | |
| a(x+2,y-3) | a(x+2,y-2) | a(x+2,y-1) | a(x+2,y) | a(x+2,y+1) | a(x+2,y+2) | a(x+2,y+3) | |
| a(x+1,y-3) | a(x+1,y-2) | a(x+1,y-1) | a(x+1,y) | a(x+1,y+1) | a(x+1,y+2) | a(x+1,y+3) | |
| a(x,y-3) | a(x,y-2) | a(x,y-1) | a(x,y) | a(x,y+1) | a(x,y+2) | a(x,y+3) | |
| a(x-1,y-3) | a(x-1,y-2) | a(x-1,y-1) | a(x-1,y) | a(x-1,y+1) | a(x-1,y+2) | a(x-1,y+3) | |
| a(x-2,y-3) | a(x-2,y-2) | a(x-2,y-1) | a(x-2,y) | a(x-2,y+1) | a(x-2,y+2) | a(x-2,y+3) | a(x-2,y+4) |
| a(x-3,y-3) | a(x-3,y-2) | a(x-3,y-1) | a(x-3,y) | a(x-3,y+1) | a(x-3,y+2) | a(x-3,y+3) | a(x-3,y+4) |

GF2

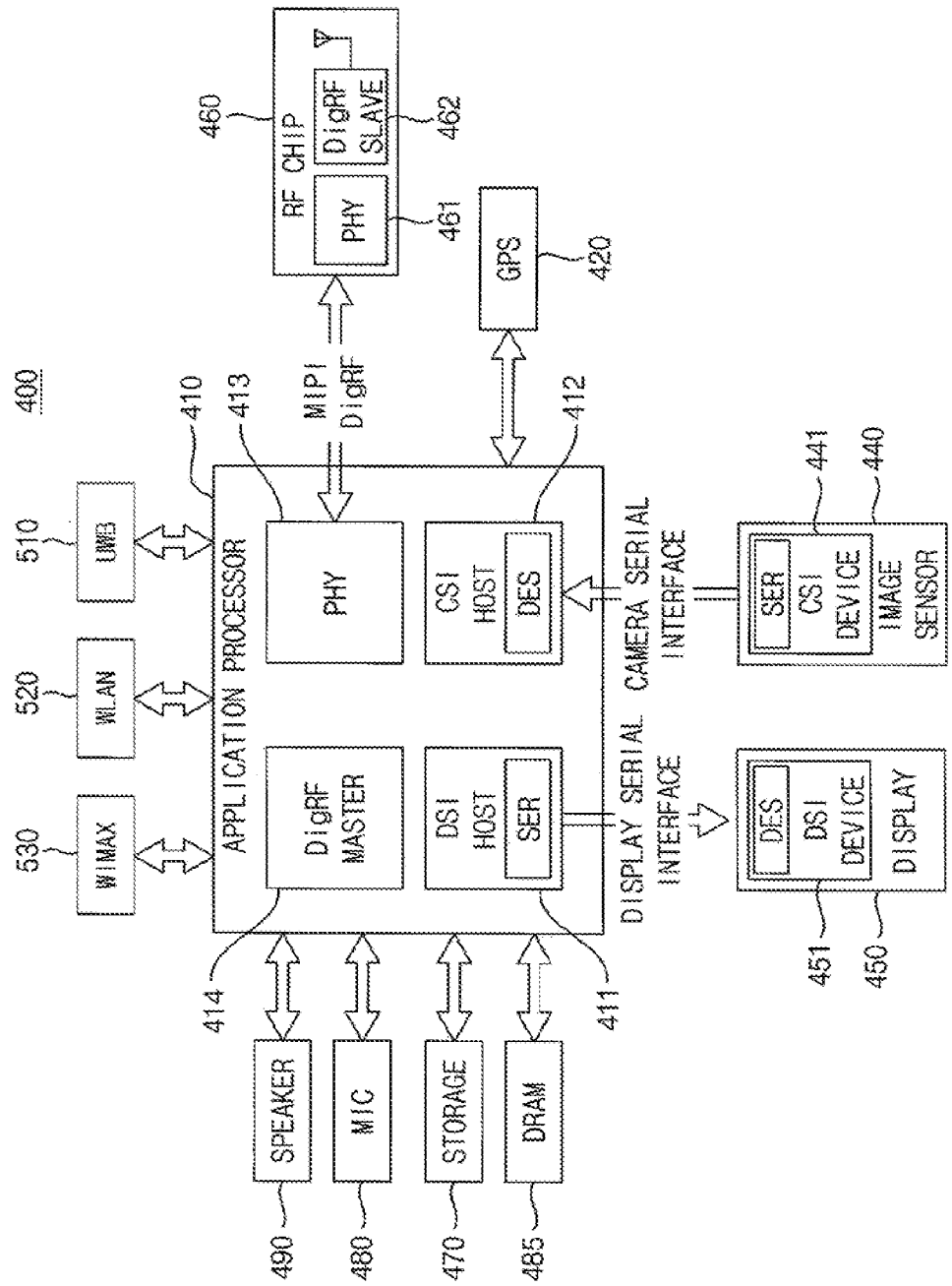

IMAGE PROCESSING DEVICE THAT REMOVES HAZE FROM IMAGE

CROSS-REFERENCE TO RELATED APPLICATION

This U.S. non-provisional application claims priority under 35 USC § 119 from, and the benefit of, Korean Patent Application No. 10-2015-0144451, filed on Oct. 16, 2015 in the Korean Intellectual Property Office (KIPO), the contents of which are herein incorporated by reference in their entirety.

BACKGROUND

1. Technical Field

Exemplary embodiments are directed generally to image processing, and more particularly to a device for removing haze from an RGB image by mixing a detail layer of a near-infrared (NIR) image with the RGB image.

2. Discussion of the Related Art

When an image capturing device such as a digital camera captures a real image, haze may occur in the captured image due to light scattered by particles in the atmosphere. The extent or the amount of the haze may vary depending on a distance between the image capturing device and the captured object, the size of the particles in the atmosphere, etc.

Noise and bluish artifacts may be caused if the haze is removed using conventional schemes when most RGB pixel data are lost due to the dense haze. Haze in an RGB image should be effectively removed without such effects.

SUMMARY

At least one exemplary embodiment of the present disclosure can provide a device for removing haze from an RGB image to restore the outline of the RGB image by mixing a detail layer of an NIR image with the RGB image.

At least one exemplary embodiment of the present disclosure can provide a device for removing haze in an RGB image to restore the outline of the RGB image by mixing a detail layer of a R image to the GB image.

According to exemplary embodiments, a device for removing haze from an image includes an image decomposer, a weight generator, a detail layer mixer, a base layer dehazer and an adder. The image decomposer decomposes a near-infrared (NIR) image to generate an NIR detail layer image and decomposes an RGB image to generate an RGB detail layer image and an RGB base layer image. The weight generator generates a mixing weight value based on a similarity between high frequency (HF) components of the NIR image and the RGB image. The detail layer mixer mixes the NIR detail layer image and the RGB detail layer image based on the mixing weight value to generate a mixed RGB detail layer image. The base layer dehazer removes haze from the RGB base layer image to generate a compensated RGB base layer image. The adder adds the mixed RGB detail layer image and the compensated RGB base layer image to generate an output RGB image. The output RGB image is substantially free of haze.

The image decomposer may perform low-pass filtering on the NIR image using a Gaussian filter to generate an NIR base layer image and subtract the NIR base layer image from the NIR image to generate the NIR detail layer image.

The image decomposer may perform low-pass filtering on the RGB image using a Gaussian filter to generate the RGB base layer image and subtract the RGB base layer image from the RGB image to generate the RGB detail layer image.

The similarity may decrease and the mixing weight value may increase as an amount of haze in the RGB image increases, where the mixing weight value corresponds to a ratio of mixing the NIR detail layer image with the RGB detail layer image.

The RGB image may include a red (R) image, a green (G) image and a blue (B) image, the similarity may include an R similarity between the HF components of the NIR image and the R image, a G similarity between the HF components of the NIR image and the G image, and a B similarity between the HF components of the NIR image and the B image, and the mixing weight value may include an R mixing weight value corresponding to the R similarity, a G mixing weight value corresponding to the G similarity, and a B mixing weight value corresponding to the B similarity.

The R similarity may correspond to an area of a region of a histogram of the HF component of the NIR image that overlaps a histogram of the HF component of the R image, the G similarity may correspond to an area of a region of the histogram of the HF component of the NIR image that overlaps a histogram of the HF component of the G image, and the B similarity may correspond to an area of a region of the histogram of the HF component of the NIR image that overlaps a histogram of the HF component of the B image.

The R similarity, the G similarity and the B similarity may be equal to each other when the RGB image does not include haze. When an amount of haze in the RGB image increases, the G similarity may decrease more rapidly than the R similarity, the B similarity may decrease more rapidly than the G similarity, the G mixing weight value may increase more rapidly than the R mixing weight value, and the B mixing weight value may increase more rapidly than the G mixing weight value.

The NIR image may be divided into first through Nth NIR patches, where N is a positive integer, the RGB image may be divided into first through Nth RGB patches, the NIR detail layer image may be divided into first through Nth NIR detail layer patches, the RGB detail layer image may be divided into first through Nth RGB detail layer patches, the mixed RGB detail layer image may be divided into first through Nth mixed RGB detail layer patches, the mixing weight value may include first through Nth patch mixing weight values, and the similarity may include first through Nth patch similarities. The detail layer mixer may mix the Kth NIR detail layer patch and the Kth RGB detail layer patch based on the Kth patch mixing weight value to generate the Kth mixed RGB detail layer patch where K is a positive integer less than or equal to N.

The Kth RGB patch may include a Kth R patch, a Kth G patch and a Kth B patch, the Kth patch similarity may include a Kth R patch similarity between the HF components of the Kth NIR patch and the Kth R patch, a Kth G patch similarity between the HF components of the Kth NIR patch and the Kth G patch and a Kth B patch similarity between the HF components of the Kth NIR patch and the Kth B patch, and the Kth patch mixing weight value may include a Kth R patch mixing weight value corresponding to the Kth R patch similarity, a Kth G patch mixing weight value corresponding to the Kth G patch similarity and a Kth B patch mixing weight value corresponding to the Kth B patch similarity.

The Kth R patch similarity may correspond to an area of a region of a histogram of the HF component of the Kth NIR patch that overlaps a histogram of the HF component of the Kth R patch, the Kth G patch similarity may correspond to an area of a region of a histogram of the HF component of the Kth NIR patch that overlaps a histogram of the HF component of the Kth G patch, and the Kth B patch similarity may correspond to an area of a region of a histogram of the HF component of the Kth NIR patch that overlaps a histogram of the HF component of the Kth B patch.

The weight generator may output a value obtained by subtracting the Kth patch similarity from 1 as the Kth patch mixing weight value when a sum of absolute values of the HF components of the Kth NIR patch is greater than or equal to a sum of absolute values of the HF components of the Kth RGB patch. The weight generator may output 0 as the Kth patch mixing weight value when the sum of the absolute values of the HF components of the Kth NIR patch is less than the sum of the absolute values of the HF components of the Kth RGB patch.

The weight generator may output a value obtained by subtracting the Kth patch similarity from 1 as a Kth temporary weight value when a sum of absolute values of the HF components of the Kth NIR patch is greater than or equal to a sum of absolute values of the HF components of the Kth RGB patch. The weight generator may output 0 as the Kth temporary weight value when the sum of the absolute values of the HF components of the Kth NIR patch is less than the sum of the absolute values of the HF components of the Kth RGB patch. The weight generator may generate the Kth patch mixing weight value by compensating the Kth temporary weight value such that a boundary between the first through Nth mixed RGB detail layer patches becomes similar to a boundary between the first through Nth RGB patches.

The weight generator may generate the Kth patch mixing weight value by compensating the Kth temporary weight value by guided filtering, joint bilateral filtering or a Laplacian matrix such that the boundary between the first through Nth mixed RGB detail layer patches becomes similar to the boundary between the first through Nth RGB patches.

The RGB base layer image may be divided into first through Nth RGB base layer patches and the compensated RGB base layer image may be divided into first through Nth compensated RGB base layer patches. The base layer dehazer may extract a Kth transmission coefficient that corresponds to a minimum value of a plurality of pixel data included in the Kth RGB base layer patch and compensate the Kth RGB base layer patch based on the Kth transmission coefficient to output the Kth compensated RGB base layer patch.

The output RGB image may be divided into first through Nth output RGB patches, and the adder may add the Kth mixed RGB detail layer patch and the Kth compensated RGB base layer patch to generate the Kth output RGB patch.

According to exemplary embodiments, a device for removing haze from an image includes an image decomposer, a weight generator, a detail layer mixer, a base layer dehazer and an adder. The image decomposer decomposes an RGB image to generate an RGB detail layer image and an RGB base layer image. The weight generator generates a mixing weight value based on a similarity between high frequency (HF) components of an R image and a GB image included in the RGB image. The detail layer mixer mixes an R detail layer image included in the RGB detail layer image and a GB detail layer image included in the RGB detail layer image based on the mixing weight value to generate a mixed RGB detail layer image. The base layer dehazer removes haze from the RGB base layer image to generate a compensated RGB base layer image. The adder adds the mixed RGB detail layer image and the compensated RGB base layer image to generate an output RGB image. The output RGB image is substantially free of haze.

The similarity may decrease and the mixing weight value may increase as an amount of haze in the RGB image increases, the mixing weight value corresponding to a ratio of mixing the R detail layer image with the GB detail layer image.

According to exemplary embodiments, a method for removing haze from an image includes decomposing a near-infrared (NIR) image to generate an NIR detail layer image and decomposing an RGB image to generate an RGB detail layer image and an RGB base layer image, generating a mixing weight value based on a similarity between high frequency (HF) components of the NIR image and the RGB image, mixing the NIR detail layer image and the RGB detail layer image based on the mixing weight value to generate a mixed RGB detail layer image, removing haze from the RGB base layer image to generate a compensated RGB base layer image, and adding the mixed RGB detail layer image and the compensated RGB base layer image to generate an output RGB image. The output RGB image is substantially free of haze.

Decomposing the near-infrared (NIR) image may comprise performing low-pass filtering on the NIR image using a Gaussian filter to generate an NIR base layer image and subtracting the NIR base layer image from the NIR image to generate the NIR detail layer image. Decomposing the RGB image may comprise performing low-pass filtering on the RGB image using a Gaussian filter to generate the RGB base layer image and subtracting the RGB base layer image from the RGB image to generate the RGB detail layer image.

The similarity may decrease and the mixing weight value may increase as an amount of haze in the RGB image increases, the mixing weight value corresponding to a ratio of mixing the NIR detail layer image with the RGB detail layer image.

A device for removing haze from an RGB image according to exemplary embodiments can restore the outline of an RGB image and enhance quality of an RGB image by mixing the detail layer of the NIR image with the RGB image. In addition, a device for removing haze in an RGB image according to exemplary embodiments can restore the outline of an RGB image and enhance quality of an RGB image by mixing the detail layer of the R image with that of the GB image.

BRIEF DESCRIPTION OF THE DRAWINGS

FIGS. 2, 3 and 4 are diagrams that illustrate Gaussian filters used by an image decomposer in a device of FIG. 1.

FIG. 10 is a block diagram that illustrates an interface employable in a computer system of FIG. 9.

DETAILED DESCRIPTION OF EXEMPLARY EMBODIMENTS

Figure 1:
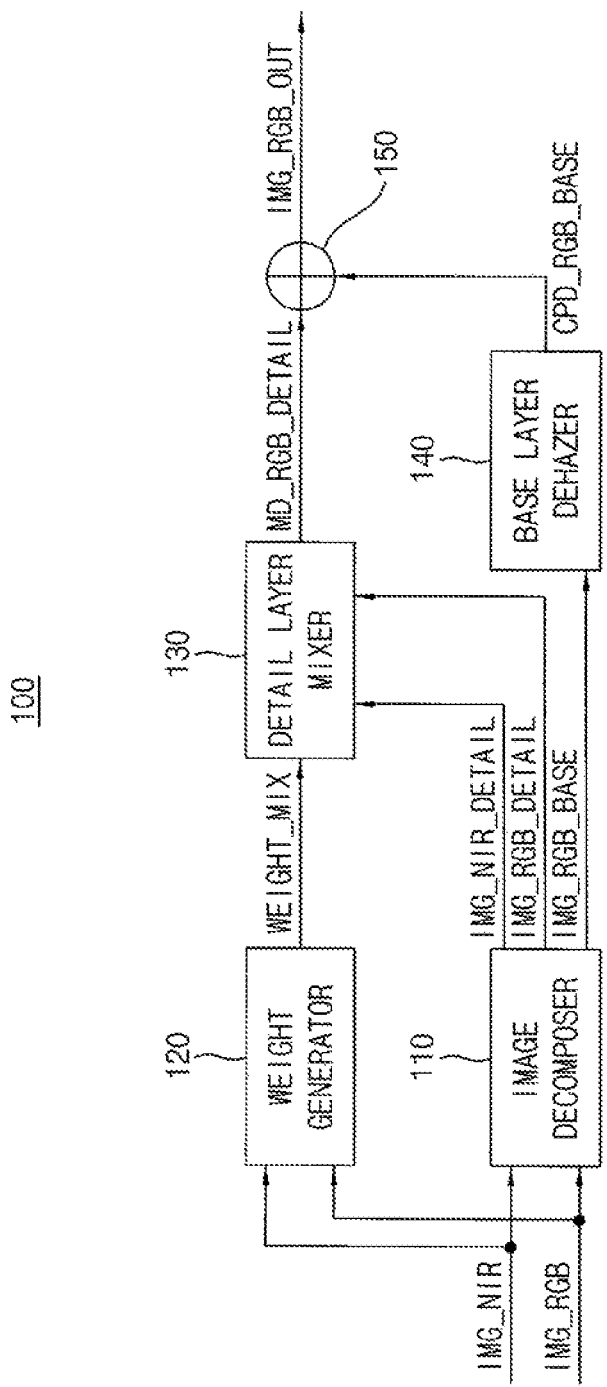
FIG. 1 is a block diagram that illustrates a device for removing haze in an image according to exemplary embodiments.

Various embodiments will be described more fully hereinafter with reference to the accompanying drawings, in which some exemplary embodiments are shown. Embodiments of the present disclosure may, however, take many different forms and should not be construed as limited to the exemplary embodiments set forth herein. In the drawings, the sizes and relative sizes of layers and regions may be exaggerated for clarity. Like numerals may refer to like elements throughout.

It will be understood that when an element is referred to as being "connected" or "coupled" to another element, it can be directly connected or coupled to the other element or intervening elements may be present.

FIG. 1 is a block diagram that illustrates a device for removing haze in an image, according to exemplary embodiments.

Referring to FIG. 1, a device 100 for removing haze in an image includes an image decomposer 110, a weight generator 120, a detail layer mixer 130, a base layer dehazer 140 and an adder 150.

According to an embodiment, the image decomposer 110 decomposes a near-infrared (NIR) image IMG_NIR to generate an NIR detail layer image IMG_NIR_DETAIL and decomposes an RGB image IMG_RGB to generate an RGB detail layer image IMG_RGB_DETAIL and an RGB base layer image IMG_RGB_BASE. The operation of the image decomposer 110 will be further described below with reference to FIGS. 2, 3 and 4.

According to an embodiment, the weight generator 120 generates a mixing weight value WEIGHT_MIX based on a similarity between high frequency (HF) components of the NIR image IMG_NIR and the RGB image IMG_RGB. The detail layer mixer 130 mixes the NIR detail layer image IMG_NIR_DETAIL, and the RGB detail layer image IMG_RGB_DETAIL based on the mixing weight value WEIGHT_MIX to generate a mixed detail layer image MD_RGB_DETAIL. The base layer dehazer 140 removes haze from the RGB base layer image IMG_RGB_BASE to generate a compensated RGB base layer image CPD_RGB_BASE. The adder 150 adds the mixed detail layer image MD_RGB_DETAIL and the compensated RGB base layer image CPD_RGB_BASE to generate an output RGB image IMG_RGB_OUT. The configuration of the adder 150 is well known to those skilled in the art and thus further descriptions are omitted.

An exemplary embodiment of the base layer dehazer 140 will be described below with reference to FIG. 5. The operations of the weight generator 120, the detail layer mixer 130 and the adder 150 will be described below with reference to FIGS. 6 and 7.

According to an embodiment, the RGB image IMG_RGB includes a red (R) image, a green (G) image and a blue (B) image. The similarity includes an R similarity between the HF components of the NIR image IMG_NIR and the R image, a G similarity between the HF components of the NIR image IMG_NIR and the G image, and a B similarity between the HF components of the NIR image IMG_NIR and the B image.

According to an embodiment, the mixing weight value WEIGHT_MIX includes an R mixing weight value corresponding to the R similarity, a G mixing weight value corresponding to the G similarity and a B mixing weight value corresponding to the B similarity.

According to an embodiment, the R similarity corresponds to an area of a region of a histogram of the HF component of the NIR image IMG_NIR that overlaps a histogram of the HF component of the R image. The G similarity corresponds to an area of a region of the histogram of the HF component of the NIR image IMG_NIR that overlaps a histogram of the HF component of the G image. The B similarity corresponds to an area of a region of the histogram of the HF component of the NIR image IMG_NIR that overlaps a histogram of the HF component of the B image.

In some exemplary embodiments, when an amount of haze in the RGB image IMG_RGB increases, the G similarity decreases more rapidly than the R similarity, the B similarity may decreases more rapidly than the G similarity, the G mixing weight value increases more rapidly than the R mixing weight value, and the B mixing weight value increases more rapidly than the G mixing weight value. The R, G and B similarities and the R, G and B mixing weight values will be further described below with reference to FIGS. 6 and 7.

In some exemplary embodiments, as the amount of the haze in the RGB image IMG_RGB increases, the similarity decreases and the mixing weight value WEIGHT_MIX increases, where the mixing weight value WEIGHT_MIX corresponds to a ratio of mixing the NIR detail layer image IMG_NIR_DETAIL to the RGB detail layer image IMG_RGB_DETAIL. In other words, as the amount of haze in the RGB image IMG_RGB decreases, the similarity increases and the mixing weight value WEIGHT_MIX decreases.

Figure 2:
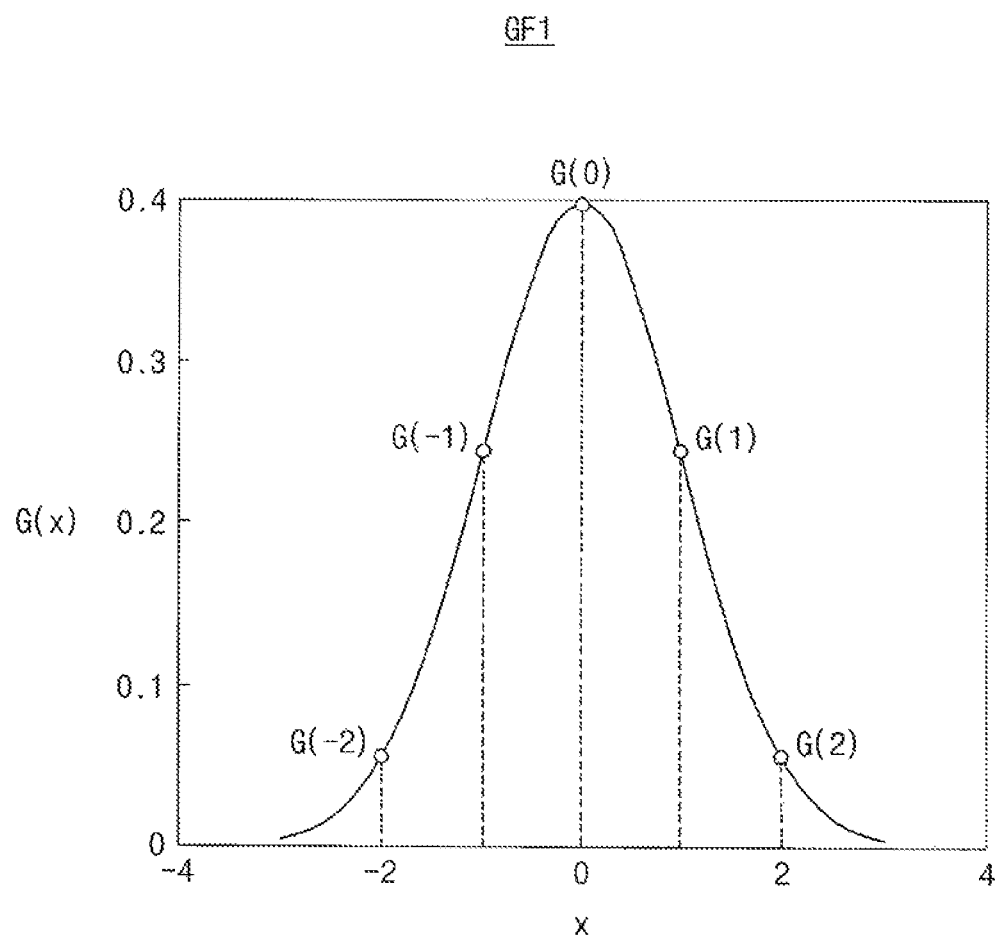

FIGS. 2, 3 and 4 illustrates Gaussian filters used by an image decomposer in a device of FIG. 1.

FIG. 2 illustrates a one-dimensional Gaussian filter GF1. For example, a one-dimensional Gaussian filter GF1 can be represented by coefficient values G(−2), G(−1), G(0), G(1) and G(2).

FIG. 3 illustrates a two-dimensional 5×5 Gaussian filter GF2. For example, a two-dimensional Gaussian filter GF2 can be represented by coefficient values G(−2, −2) through G(2, 2). The coefficient value G(0, 0) corresponding to a center pixel of the two-dimensional Gaussian filter GF2 has a maximum value and pixels nearer the center pixel have greater coefficient values. The size of a two-dimensional Gaussian filter is not limited to 5×5 and the size may be variously determined.

Referring to FIG. 4, according to an embodiment, a first image IMG1 includes a plurality of pixels a(x−3, y−3) through a(x−2, y+4). The image decomposer 110 generates an NIR base layer image by performing low-pass filtering on the NIR image IMG_NIR using the two-dimensional Gaussian filter GP2 of FIG. 3. For example, the first image IMG1 of FIG. 4 may be an NIR image IMG_NIR and the pixel data b(x, y) of the pixel coordinates (x, y) on the NIR base layer image can be calculated through Equation 1, below. The image decomposer 110 repeats the calculation of Equation 1 by shifting the pixel coordinates (x, y) to generate the NIR base layer image. The image decomposer 110 subtracts the NIR base layer image from the NIR image IMG_NIR to generate the NIR detail layer image IMG_NIR_DETAIL.

$$b(x, y) = \sum_{s=-2}^{2} \sum_{t=-2}^{2} G(s, t) \times a(x-s, y-t) \qquad \text{Equation 1}$$

In Equation 1, G(s,t) represents the two-dimensional Gaussian filter GF2 of FIG. 3.

In addition, according to an embodiment, the image decomposer 110 performs low-pass filtering on the RGB image IMG_RGB using the two-dimensional Gaussian filter GF2 of FIG. 3 to generate the RGB base layer image IMG_RGB_BASE. For example, the first image IMG1 of FIG. 4 may be an RGB image IMG_RGB and the pixel data b(x, y) of the pixel coordinates (x, y) on the RGB base layer image IMG_RGB_BASE can be calculated through Equation 1. The image decomposer 110 repeats the calculation of Equation 1 by shifting the pixel coordinates (x, y) to generate the RGB base layer image IMG_RGB_BASE. The image decomposer 110 subtracts the RGB base layer image IMG_RGB_BASE from the RGB image IMG_RGB to generate the RGB detail layer image IMG_RGB_DETAIL.

In some exemplary embodiments, the RGB detail layer image IMG_RGB_DETAIL represents an outline corresponding to high-frequency characteristics of the RGB image IMG_RGB and the RGB base layer image IMG_RGB_BASE represents a color corresponding to low-frequency characteristics of the RGB image IMG_RGB.

Figure 5:
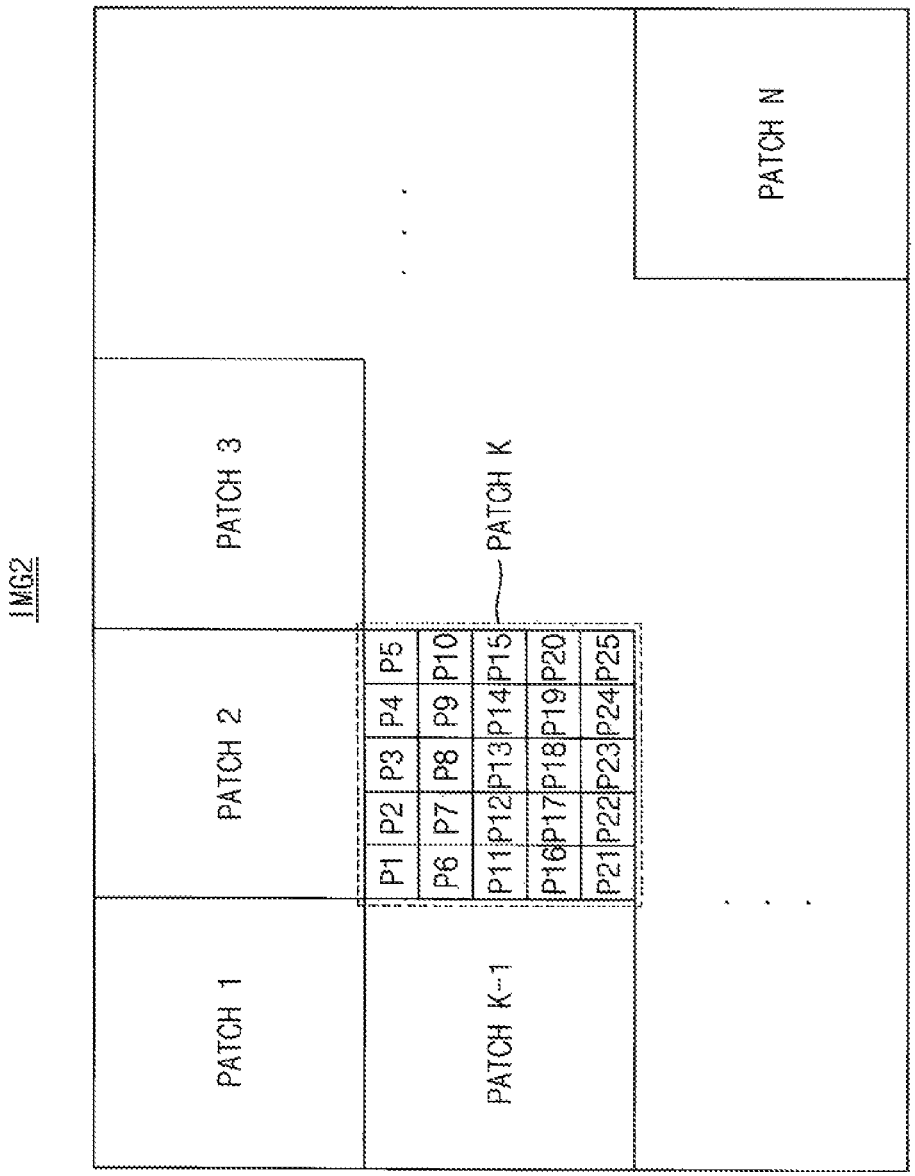
FIG. 5 illustrates the structure of patches in an image.

FIG. 5 illustrates the structure of patches in an image.

Referring to FIG. 5, according to an embodiment, a second image IMG2 includes or is divided into first through Nth patches PATCH 1 through PATCH N, where N is a positive integer. The Kth patch PATCH K includes first through twenty fifth pixel data P1 through P25, where K is a positive integer equal to or less than N. The number of pixel data in each patch may be variously determined. Each of the first through twenty fifth pixel data P1 through P25 includes R pixel data, G pixel data and B pixel data.

When the second image IMG2 of FIG. 5 is an NIR image IMG_NIR, the NIR image IMG_NIR includes first through Nth NIR patches corresponding to the first through Nth patches. When the second image IMG2 of FIG. 5 is an RGB image IMG_RGB, the RGB image IMG_RGB includes first through Nth RGB patches corresponding to the first through Nth patches. When the second image IMG2 of FIG. 5 is an NIR detail layer image IMG_NIR_DETAIL, the NIR detail layer image IMG_NIR_DETAIL includes first through Nth NIR detail layer patches corresponding to the first through Nth patches. When the second image IMG2 of FIG. 5 is an RGB detail layer image IMG_RGB_DETAIL, the RGB detail layer image IMG_RGB_DETAIL includes first through Nth RGB detail layer patches corresponding to the first through Nth patches. When the second image IMG2 of FIG. 5 is a mixed detail layer image MD_RGB_DETAIL, the mixed detail layer image MD_RGB_DETAIL includes first through Nth mixed RGB detail layer patches corresponding to the first through Nth patches. When the second image IMG2 of FIG. 5 is an RGB base layer image IMG_RGB_BASE, the RGB base layer image IMG_RGB_BASE includes first through Nth RGB base layer patches corresponding to the first through Nth patches. When the second image IMG2 of FIG. 5 is a compensated RGB base layer image CPD_RGB_BASE, the compensated RGB base layer image CPD_RGB_BASE includes first through Nth RGB base layer patches corresponding to the first through Nth patches. When the second image IMG2 of FIG. 5 is an output RGB image IMG_RGB_OUT, the output RGB image IMG_RGB_OUT includes first through Nth output RGB patches corresponding to the first through Nth patches.

According to an embodiment, the mixing weight value WEIGHT_MIX includes first through Nth patch mixing weight values corresponding to the first through Nth patches. The similarity includes first through Nth patch similarities corresponding to the first through Nth patches.

According to an embodiment, the base layer dehazer 140 extracts a Kth transmission coefficient $t^b(x)$ corresponding to a minimum value of a plurality of pixel data included in the Kth RGB base layer patch as represented by Equation 2.

$$t^b(x) = 1 - w \times \min_{x \in \Omega^k}\left(\min_c \frac{I_c^b(x)}{A_c^b}\right), c \in \{R, G, B\} \qquad \text{Equation 2}$$

In Equation 2, w represents an aerial perspective parameter having a value between 0 and 1, $\Omega^k$ represents the Kth RGB base layer patch, x represents a pixel coordinate in the Kth RGB base layer patch $\Omega^k$, c indicates one of the R, G and B color channels, $I^b_R(x)$ represents the R pixel data at the pixel coordinate x of the RGB base layer image IMG_RGB_BASE, $I^b_G(x)$ represents the G pixel data at the pixel coordinate x of the RGB base layer image IMG_RGB_BASE and $I^b_B(x)$ represents the B pixel data at the pixel coordinate x of the RGB base layer image IMG_RGB_BASE. $A^b_R$ represents an R aerial constant extracted from the entire R pixel data in the RGB base layer image IMG_RGB_BASE, $A^b_G$ represents a G aerial constant extracted from the entire G pixel data in the RGB base layer image IMG_RGB_BASE, and $A^{b-}_{RB}$ represents a B aerial constant extracted from the entire B pixel data in the RGB base layer image IMG_RGB_BASE. The aerial constants $A^b_R, A^b_G, A^b_B$ are well known to those skilled in the art and thus further descriptions are omitted.

According to an embodiment, the base layer dehazer 140 compensates the Kth RGB base layer patch $\Omega^k$ based on the Kth transmission coefficient $t^b(x)$ according to Equation 3 to output the Kth compensated RGB base layer patch.

$$I^b_{c,cpd}(x) = \frac{I_c^b(x) - A_c^b}{\max(t^b(x), t_0)} + A_c^b \qquad \text{Equation 3}$$

In Equation 3, $I^b_{R,cpd}(x)$ represents the R pixel data at the coordinate x in the Kth compensated RGB base layer patch, $I^b_{G,cpd}(x)$ represents the G pixel data at the coordinate x in the Kth compensated RGB base layer patch and $I^b_{B,cpd}(x)$ represents the B pixel data at the coordinate x in the Kth compensated RGB base layer patch. An exemplary, non-limiting value of $t_0$ is about 0.1.

Equation 2 and Equation 3 represent a conventional dark channel prior method. In other exemplary embodiments, the base layer dehazer 140 can be implemented using methods other than the dark channel prior method.

Figure 6:
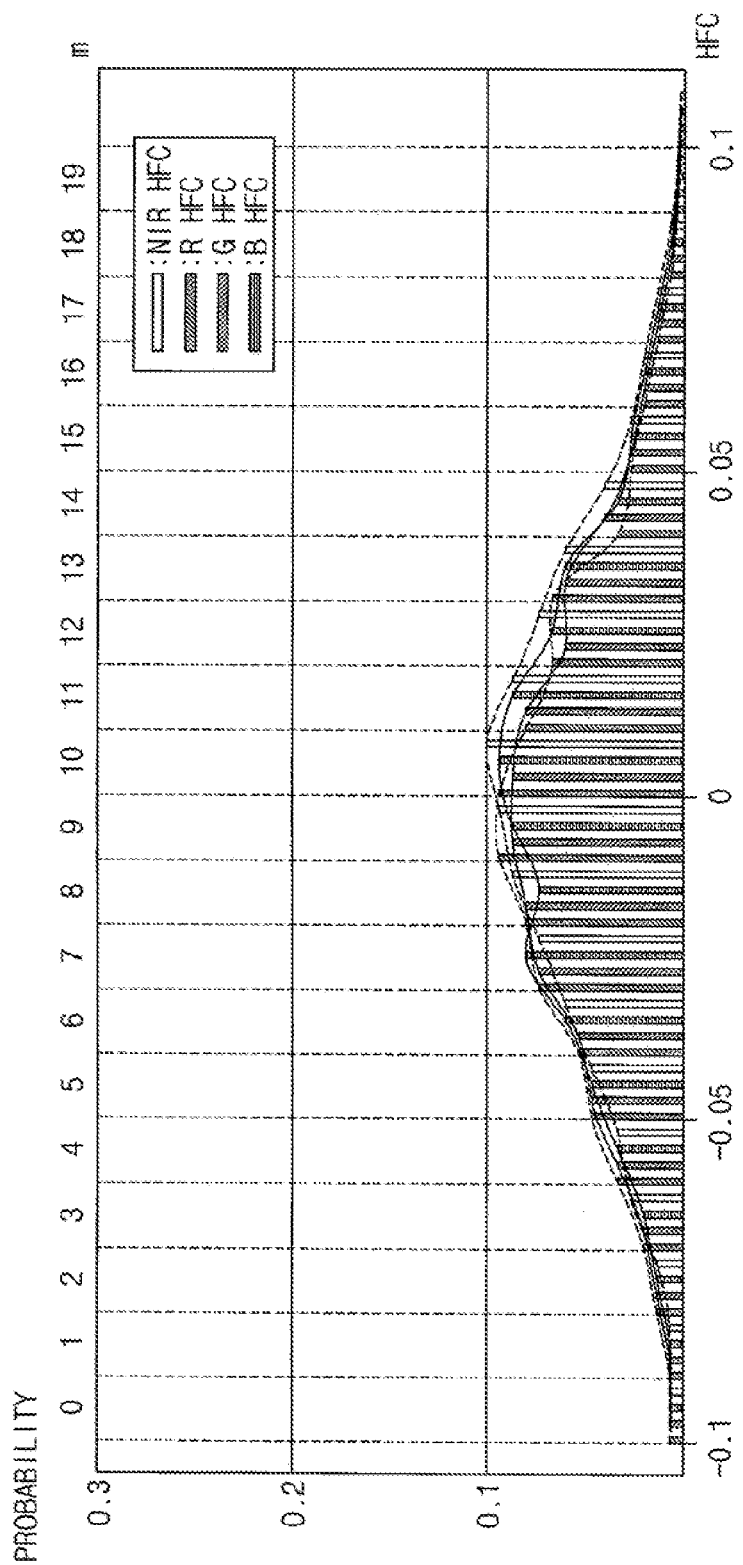
FIG. 6 illustrates histograms of high frequency (HF) components of an NIR image and an RGB image in a haze-free case.
Figure 7:
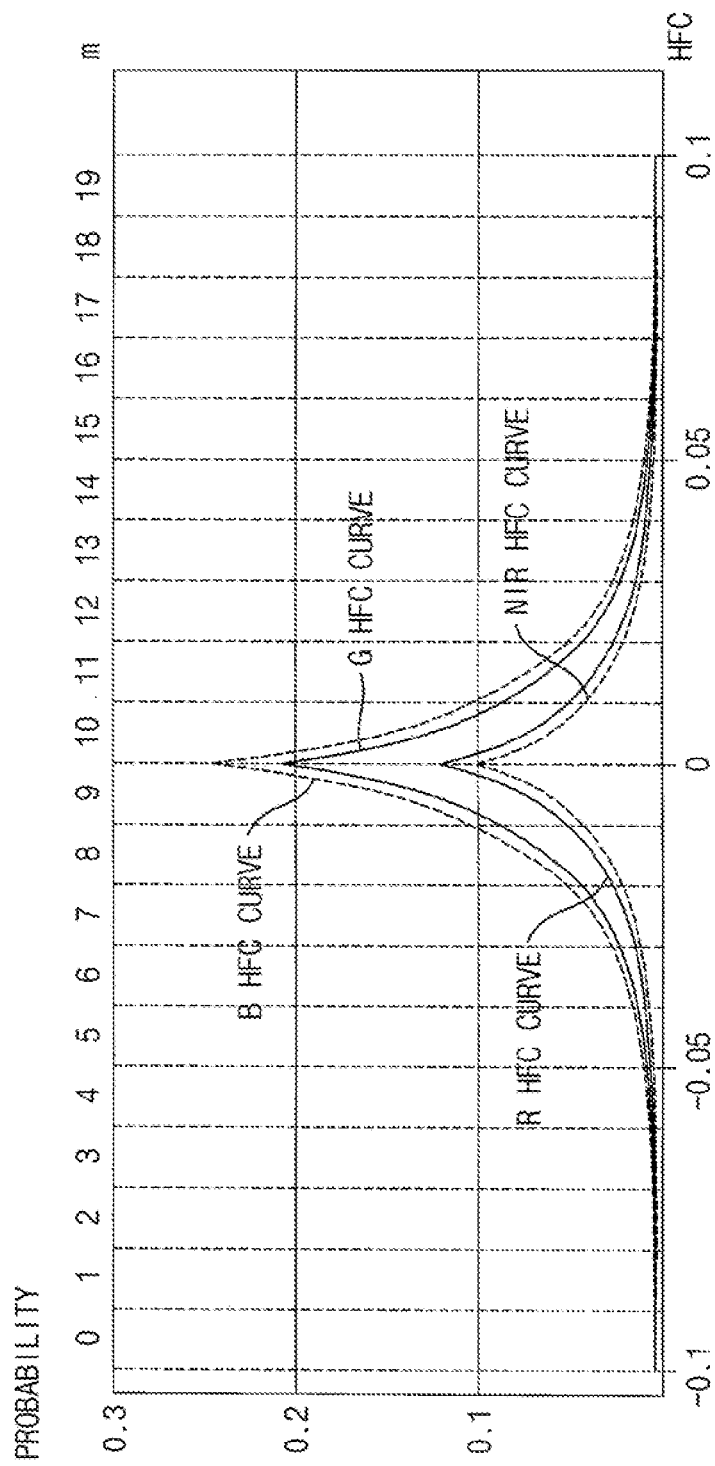
FIG. 7 illustrates histograms of HF components of an NIR image and an RGB image in a case of dense haze.

FIG. 6 illustrates histograms of high frequency (HF) components of an NIR image and an RGB image in a haze-free case, and FIG. 7 illustrates histograms of HF components of an NIR image and an RGB image in a case of dense haze.

In general, light scattering in the atmosphere may be modeled by Equation 4.

$$I_c(x) = t(x)J_c(x) + (1-t(x))A_c, c \in \{R, G, B\} \qquad \text{Equation 4}$$

In Equation 4, $I_R(x)$ represents the R pixel data at the coordinate x of the RGB image IMG_RGB, $I_G(x)$ represents the G pixel data at the coordinate x of the RGB image IMG_RGB and $I_B(x)$ represents the B pixel data at the coordinate x of the RGB image IMG_RGB. t(x) represents a transmission coefficient of the atmosphere, $J_R(x), J_G(x)$ and $J_B(x)$ are the respective R, G and B pixel data obtained by removing the haze from $I_R(x)$, $I_G(x)$ and $I_B(x)$, respectively. $A_R$ is the aerial constant extracted from the entire R pixel data in the RGB image IMG_RGB, $A_G$ is the aerial constant extracted from the entire G pixel data in the RGB image IMG_RGB, and $A_B$ is the aerial constant extracted from the entire B pixel data in the RGB image IMG_RGB.

The transmission coefficient t(x) can be regarded as a constant value t in a narrow region of the Kth RGB patch $\Omega^k$ and Equation 4 may be approximated as Equation 5.

$$\frac{1}{N^k}\sum_{x\in\Omega^k} I_c(x) = t^k \frac{1}{N^k}\sum_{x\in\Omega^k} J_c(x) + (1-t^k)A_c \quad \text{Equation 5}$$

Equation 5 is expressed in terms of the averages of the pixel data and thus can be expressed more simply as Equation 6.

$$\overline{I}_c^k(x) = t^k \overline{J}_c^k(x) + (1-t^k)A_c \quad \text{Equation 6}$$

The HF component $\Delta I_c^k(x) \equiv I_c(x) - \overline{I}_c^k(x)$ of the pixel data at the coordinate x in the Kth RGB patch $\Omega^k$ can be obtained by Equation 7, which corresponds to the difference between Equation 4 and Equation 6. Equation 7 can be simplified as Equation 8.

$$I_c(x) - \overline{I}_c^k(x) = \{t^k J_c(x) + (1-t^k)A_c\} - \{t^k \overline{J}_c^k(x) + (1-t^k)A_c\} \quad \text{Equation 7}$$
$$= t^k(J_c(x) - \overline{J}_c^k(x)).$$

$$\Delta I_c^k(x) = t^k \Delta J_c^k(x) \quad \text{Equation 8}$$

The HF component $\Delta I_c^k(x)$ of the pixel data at the coordinate x in the Kth RGB patch $\Omega^k$ is proportional to the transmission coefficient t(x). The transmission coefficient t(x) can be expressed as a scattering coefficient β and a function of a distance d(x) between the image capturing device and the object as Equation 9.

$$t(x) = e^{-\beta \cdot d(x)} \quad \text{Equation 9}$$

The scattering coefficient β may be modeled using Rayleigh's law with a wavelength λ and a particle size parameter γ as expressed by Equation 10.

$$\beta \propto \frac{1}{\lambda^\gamma} \quad \text{Equation 10}$$

Referring to Equations 8, 9 and 10, in case of a hazy image, the HF component $\Delta I_c^k(x)$ of the pixel data at the coordinate x in the Kth RGB patch $\Omega^k$ decreases as the wavelength λ decreases. In other words, in case of a hazy image, the HF component $\Delta I_R^k(x)$ of the R pixel data at the coordinate x in the Kth RGB patch $\Omega^k$ is less than the HF component $\Delta I_n^k(x)$ of the pixel data at the coordinate x in the Kth NIR patch, the HF component $\Delta I_G^k(x)$ of the G pixel data at the coordinate x in the Kth RGB patch $\Omega^k$ is less than the HF component $\Delta I_R^k(x)$ of the R pixel data at the coordinate x in the Kth RGB patch $\Omega^k$, and the HF component $\Delta I_B^k(x)$ of the B pixel data at the coordinate x in the Kth RGB patch $\Omega^k$ is less than the HF component $\Delta I_G^k(x)$ of the G pixel data at the coordinate x in the Kth RGB patch $\Omega^k$. Accordingly the extent or the amount of the haze in the RGB image IMG_RGB can be estimated by comparing the HF component of the Kth RGB patch with the HF component of the Kth NIR patch.

According to an embodiment, the Kth RGB patch $\Omega^k$ includes the Kth R patch, the Kth G patch and the Kth B patch. The Kth patch similarity includes the Kth R patch similarity, the Kth G patch similarity and the Kth B patch similarity.

According to an embodiment, the Kth R patch similarity represents the degree of similarity between the HF components of the Kth NIR patch and the Kth R patch. The Kth G patch similarity represents the degree of similarity between the HF components of the Kth NIR patch and the Kth G patch. The Kth B patch similarity represents the degree of similarity between the HF components of the Kth NIR patch and the Kth B patch.

Referring to FIG. 6, the Kth patch similarity $H(h^k_{I,n}, h^k_{I,c})$, which includes the Kth R patch similarity $H(h^k_{I,n}, h^k_{I,R})$, the Kth G patch similarity $H(h^k_{I,n}, h^k_{I,G})$ and the Kth B patch similarity $H(h^k_{I,n}, h^k_{I,B})$, can be represented by Equation 11.

$$H(h^k_{I,n}, h^k_{I,c}) = \sum_{m=1}^{M} \min(h^{k,m}_{I,n}, h^{k,m}_{I,c}) \quad \text{Equation 11}$$

The histogram may have M sections, and M can be 20 as illustrated in FIGS. 6 and 7. $h^{k,m}_{I,n}$ represents a probability of the mth section in the histogram of the HF component (HFC) of the Kth NIR patch, $h^{k,m}_{I,R}$ represents a probability of the mth section in the histogram of the HF component of the Kth R patch included in the Kth RGB patch, $h^{k,m}_{I,G}$ represents a probability of the mth section in the histogram of the HF component of the Kth G patch included in the Kth RGB patch and $h^{k,m}_{I,B}$ represents a probability of the mth section in the histogram of the HF component of the Kth B patch included in the Kth RGB patch. Each histogram satisfies $\sum_{m=1}^{M} h^{k,m}_{I,n} = \sum_{m=1}^{M} h^{k,m}_{I,c} = 1$.

According to an embodiment, the R similarity corresponds to an area of an region of a histogram of the HF component of the NIR image that overlaps a histogram of the HF component of the R image, the G similarity corresponds to an area of an region of the histogram of the HF component of the NIR image that overlaps a histogram of the HF component of the G image, and the B similarity corresponds to an area of an region of the histogram of the HF component of the NIR image that overlaps a histogram of the HF component of the B image.

The Kth R patch similarity corresponds to an area of an region of a histogram of the HF component of the Kth NIR patch that overlaps a histogram of the HF component of the Kth R patch. The Kth G patch similarity corresponds to an area of an region of a histogram of the HF component of the Kth NIR patch that overlaps a histogram of the HF component of the Kth G patch. The Kth B patch similarity corresponds to an area of an region of a histogram of the HF component of the Kth NIR patch that overlaps a histogram of the HF component of the Kth B patch.

According to an embodiment, the Kth patch mixing weight value $W^k_c$ can be obtained from Equation 12.

$$W^k_c = \begin{cases} 1 - H(h^k_{I,n}, h^k_{I,c}), & \text{if } \sum_{x\in\Omega_k} |\Delta I^k_n(x)| \geq \sum_{x\in\Omega_k} |\Delta I^k_c(x)| \\ 0, & \text{otherwise} \end{cases} \quad \text{Equation 12}$$

According to Equation 12, the weight generator 120 outputs a value obtained by subtracting the Kth patch similarity $H(h^k_{I,n}, h^k_{I,c})$ from 1 as the Kth patch mixing weight value $W^k_c$ when a sum of absolute values of the HF components of the Kth NIR patch is greater than or equal to a sum of absolute values of the HF components of the Kth RGB patch $$\left( \sum_{x \in \Omega_k} |\Delta I^k_n(x)| \geq \sum_{x \in \Omega_k} |\Delta I^k_c(x)| \right).$$

Otherwise, that is, when the sum of the absolute values of the HF components of the Kth NIR patch is less than the sum of the absolute values of the HF components of the Kth RGB patch, the weight generator 120 outputs 0 as the Kth patch mixing weight value $W^k_c$.

According to an embodiment, the detail layer mixer 130 mixes the Kth NIR detail layer patch with the Kth RGB detail layer patch based on the Kth patch mixing weight value $W^k_c$ to generate the Kth mixed RGB detail layer patch according to Equation 13.

$$I^{d,k}_{c,md}(x) = W^k_c \times I^{d,k}_n(x) + (1 - W^k_c) \times I^{d,k}_c(x) \qquad \text{Equation 13}$$

$I^{d,k}_{R,md}$ represents the R pixel data at the pixel coordinate x in the Kth mixed RGB detail layer patch, $I^{d,k}_{G,md}$ represents the G pixel data at the pixel coordinate x in the Kth mixed RGB detail layer patch, and $I^{d,k}_{B,md}$ represents the B pixel data at the pixel coordinate x in the Kth mixed RGB detail layer patch. $I^{d,k}_n$ represents the pixel data at the pixel coordinate x in the Kth NIR detail layer patch. $I^{d,k}_R$ represents the R pixel data at the pixel coordinate x in the Kth RGB detail layer patch, $I^{d,k}_G$ represents the G pixel data at the pixel coordinate x in the Kth RGB detail layer patch, and $I^{d,k}_B$ represents the B pixel data at the pixel coordinate x in the Kth RGB detail layer patch.

FIG. 6 illustrates a case when the RGB image IMG_RGB is a haze-free image, and thus all of the Kth R patch similarities $H(h^k_{I,n}, h^k_{I,R})$, the Kth G patch similarities $H(h^k_{I,n}, h^k_{I,G})$, and the Kth B patch similarities $H(h^k_{I,n}, h^k_{I,B})$ included in the Kth patch similarity $H(h^k_{I,n}, h^k_{I,c})$ are 1. All of the Kth R patch mixing weight values $W^k_R$, the Kth G patch mixing weight values $W^k_G$ and the Kth B patch mixing weight values $W^k_B$ included in the Kth patch mixing weight value $W^k_c$ are 0. As the image has no haze, the detail layer mixer 130 outputs the Kth NIR detail layer patch as the Kth mixed RGB detail layer patch.

FIG. 7 illustrates only the outline of the histograms in a case when the RGB image IMG_RGB has dense haze. The HF components are damaged and the histograms of FIG. 7 are more concentrated at 0 than the histograms of FIG. 6. In this case, the detail layer mixer 130 mixes the Kth NIR detail layer patch, which has little attenuation due to the haze, with the Kth RGB detail layer patch to generate the Kth mixed RGB detail layer patch.

In some exemplary embodiments, the weight generator 120 outputs a value obtained by subtracting the Kth patch similarity $H(h^k_{I,n}, h^k_{I,c})$ from 1 as a Kth temporary weight value when a sum of absolute values of the HF components of the Kth NIR patch is greater than or equal to a sum of absolute values of the HF components of the Kth RGB patch $$\left( \sum_{x \in \Omega_k} |\Delta I^k_n(x)| \geq \sum_{x \in \Omega_k} |\Delta I^k_c(x)| \right).$$

When the sum of the absolute values of the HF components of the Kth NIR patch is less than the sum of the absolute values of the HF components of the Kth RGB patch, the weight generator 120 outputs 0 as the Kth temporary weight value.

According to an embodiment, the weight generator 120 generates the Kth patch mixing weight value by compensating the Kth temporary weight value such that a boundary between the first through Nth mixed RGB detail layer patches becomes similar to a boundary between the first through Nth RGB patches.

In some exemplary embodiments, the weight generator 120 generates the Kth patch mixing weight value by compensating the Kth temporary weight value by guided filtering, joint bilateral filtering or Laplacian matrix such that the boundary between the first through Nth mixed RGB detail layer patches becomes similar to the boundary between the first through Nth RGB patches.

According to an embodiment, the adder 150 in FIG. 1 adds the Kth mixed RGB detail layer patch and the Kth compensated RGB base layer patch to generate the Kth output RGB patch.

The haze removing device 100 removes haze from the input image (Input) received as the RGB image IMG_RGB and outputs the output image (Ours) having a corrected outline as the output RGB image IMG_RGB_OUT. The damage due to the haze is heaviest in the input image but the haze removing device 100 may generate the output image by restoring the damage and enhancing the image quality.

Figure 8:
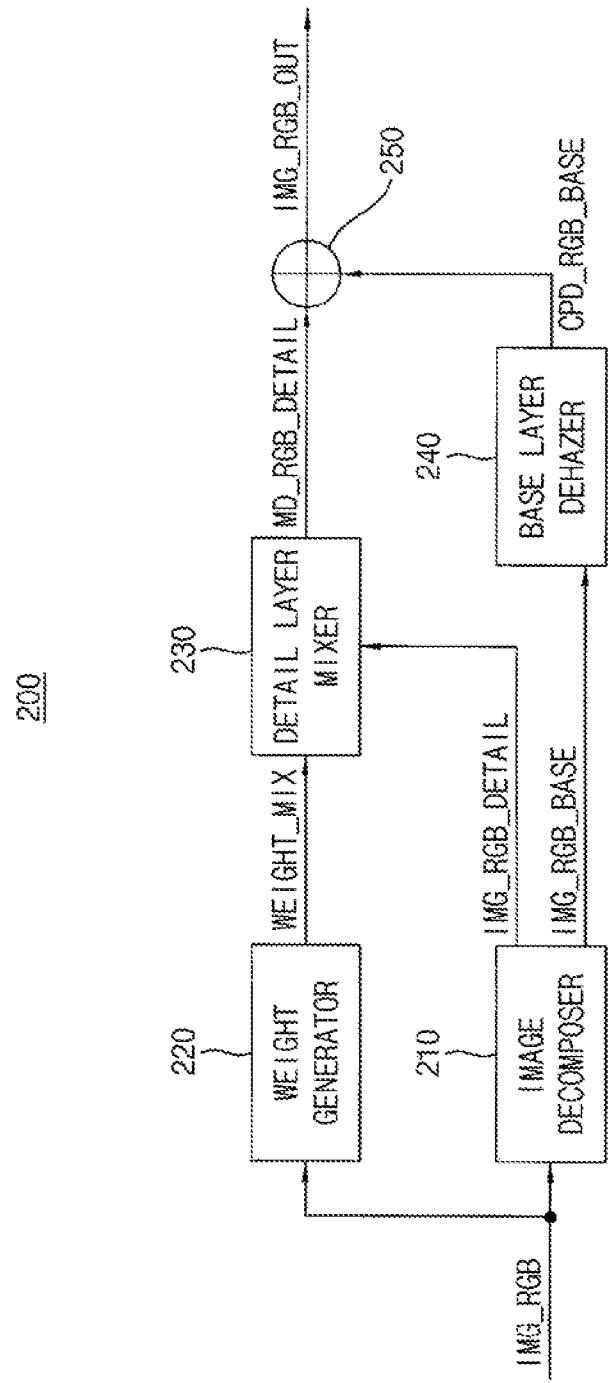
FIG. 8 is a block diagram that illustrates a device for removing haze in an image according to exemplary embodiments.

FIG. 8 is a block diagram that illustrates a device for removing haze in an image according to exemplary embodiments.

Referring to FIG. 8, a device 200 for removing haze in an image includes an image decomposer 210, a weight generator 220, a detail layer mixer 230, a base layer dehazer 240 and an adder 250.

According to an embodiment, the image decomposer 210 decomposes an RGB image IMG_RGB to generate an RGB detail layer image IMG_RGB_DETAIL and an RGB base layer image IMG_RGB_BASE. The weight generator 220 generates a mixing weight value WEIGHT_MIX based on a similarity between high frequency (HF) components of an R image and a GB image included in the RGB image IMG_RGB. The detail layer mixer 230 mixes an R detail layer image included in the RGB detail layer image IMG_RGB_DETAIL and a GB detail layer image included in the RGB detail layer image IMG_RGB_DETAIL based on the mixing weight value WEIGHT_MIX to generate a mixed detail layer image MD_RGB_DETAIL. The base layer dehazer 240 removes haze from the RGB base layer image IMG_RGB_BASE to generate a compensated RGB base layer image CPD_RGB_BASE. The adder 250 adds the mixed detail layer image MD_RGB_DETAIL and the compensated RGB base layer image CPD_RGB_BASE to generate an output RGB image IMG_RGB_OUT.

In some exemplary embodiments, the similarity decreases and the mixing weight value WEIGHT_MIX increases as an amount of the haze in the RGB image IMG_RGB increases, where the mixing weight value WEIGHT_MIX corresponds to a ratio for mixing the R detail layer image with the GB detail layer image. As the amount of the haze in the RGB image IMG_RGB decreases, the similarity increases and the mixing weight value WEIGHT_MIX decreases.

The device 200 of FIG. 8 can restore the detail layer of the RGB image based on the detail layer of the R image, which among the R, G and B images has the least damage due to the haze, in the same way as the device of FIG. 1 can restore the detail layer of the RGB image based on the detail layer of the NIR image, which has less damage due to the haze. The configuration and the operation of the device 200 of FIG. 8 can be understood with reference to FIGS. 1 through 8 and the repeated descriptions are omitted.

Figure 9:
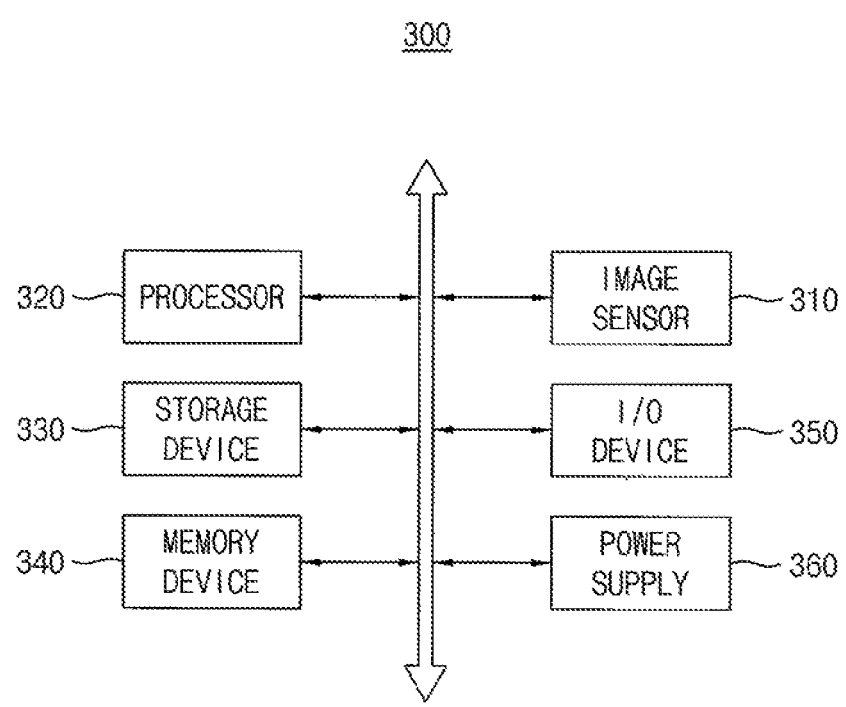
FIG. 9 is a block diagram that illustrates a computing system according to exemplary embodiments.

FIG. 9 is a block diagram that illustrates a computing system according to exemplary embodiments.

Referring to FIG. 9, according to an embodiment, a computer system 300 includes an image sensor 310, a processor 320 and a storage device 330.

According to an embodiment, the image sensor 310 generates digital signals corresponding to incident light. The storage device 330 stores the digital signals. The processor 320 controls operations of the image sensor 310 and the storage device 330. The image sensor 310 communicates with the processor 320 via the buses or other communication links.

According to an embodiment, the computer system 300 further includes a memory device 340, an input/output device 350 and a power supply 360. In addition, the computer system 300 further includes ports that communicate with a video card, a sound card, a memory card, a universal serial bus (USB) device, and/or other electronic devices.

According to an embodiment, the processor 320 performs various calculations or tasks. The processor 320 may be a microprocessor or a central processing unit (CPU). The processor 320 communicates with the storage device 330, the memory device 340, and the input/output device 350 via an address bus, a control bus, and/or a data bus. In some exemplary embodiments, the processor 320 is coupled to an extended bus, such as a peripheral component interconnection (PCI) bus. The memory device 340 stores data for operating the computer system 300.

According to an embodiment, the processor 320 includes a haze removing device as described with reference to FIGS. 1 through 8. The processor 320 removes the haze in the RGB image received from the image sensor 310, and stores the restored image in the memory device 340 or the storage device 330.

The memory device 340 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 330 may include a solid state drive (SSD), a hard disk drive (HDD), a compact-disc read-only memory (CD-ROM), etc. The input/output device 350 may include an input device, such as a keyboard, a keypad, or a mouse, and an output device, such as a printer or a display device. The power supply 360 supplies operation voltages for the computer system 300.

The computer system 1000 may be packaged in various forms, such as a package on package (PoP), ball grid arrays (BGAs), chip scale packages (CSPs), a plastic leaded chip carrier (PLCC), a plastic dual in-line package (PDIP), a die in waffle pack, a die in wafer form, chip on board (COB), a ceramic dual in-line package (CERDIP), a plastic metric quad flat pack (MQFP), a thin quad flat pack (TQFP), a small outline integrated circuit (SOIC), a shrink small outline package (SSOP), a thin small outline package (TSOP), a system in package (SIP), a multi-chip package (MCP), a wafer-level fabricated package (WFP), or a wafer-level processed stack package (WSP).

The computer system 300 can be any system having an image sensor. For example, the computer system 300 may be a digital camera, a mobile phone, a smart phone, a portable multimedia player (PMP), or a personal digital assistant (PDA).

FIG. 10 is a block diagram that illustrates an interface usable in a computer system of FIG. 9.

Referring to FIG. 10, a computer system 400 can be implemented by a data processing device that uses or supports a mobile industry processor interface (MIPI®) interface. The computer system 400 includes an application processor 410, an image sensor 440, a display device 450, etc. A CSI host 412 of the application processor 410 performs serial communication with a CSI device 441 of the image sensor 440 via a camera serial interface (CSI). In some exemplary embodiments, the CSI host 412 includes a deserializer (DES), and the CSI device 441 includes a serializer (SER). A DSI host 411 of the application processor 410 performs serial communication with a DSI device 451 of the display device 450 via a display serial interface (DSI). In some exemplary embodiments, the DSI host 411 includes a serializer (SER), and the DSI device 451 includes a deserializer (DES). The application processor 410 includes a haze removing device as described with reference to FIGS. 1 through 8. The processor 410 removes haze in the RGB image received from the image sensor 440, and stores the restored image in a DRAM device 485 or a storage device 470.

According to an embodiment, the computer system 400 further includes a radio frequency (RF) chip 460 that communicates with the application processor 410 and a DigRFSM slave 462 that communicates with other devices. A physical layer (PHY) 413 of the computer system 400 and a physical layer (PHY) 461 of the RF chip 460 perform data communications based on a MIPI® DigRFSM. The application processor 410 further includes a DigRFSM MASTER 414 that controls the data communications of the PHY 461.

According to an embodiment, the computer system 400 further includes a global positioning system (GPS) 420, the storage device 470, a microwave integrated circuit (MIC) 480, the DRAM device 485, and a speaker 490. In addition, the computer system 400 communicates using an ultra-wideband (UWB) 510, a wireless local area network (WLAN) 520, and a worldwide interoperability for microwave access (WIMAX) 530. However, embodiments of the structure and the interface of the computer system 400 are not limited thereto.

Embodiments of the present disclosure may be applied to various devices and systems. For example, an embodiment of the present disclosure may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, or a navigation system.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings of the present disclosure. Accordingly, all such modifications are intended to be included within the scope of the present disclosure as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A device for removing haze from an image, comprising:
an image decomposer that decomposes a near-infrared (NIR) image to generate an NIR detail layer image and decomposes an RGB image to generate an RGB detail layer image and an RGB base layer image;
a weight generator that generates a mixing weight value based on a similarity between high frequency (HF) components of the NIR image and the RGB image;
a detail layer mixer that mixes the NIR detail layer image and the RGB detail layer image based on the mixing weight value to generate a mixed RGB detail layer image;
a base layer dehazer that removes haze from the RGB base layer image to generate a compensated RGB base layer image; and
an adder that adds the mixed RGB detail layer image and the compensated RGB base layer image to generate an output RGB image, wherein the output RGB image is free of haze.

2. The device of claim 1, wherein the image decomposer performs low-pass filtering on the NIR image using a Gaussian filter to generate an NIR base layer image and subtracts the NIR base layer image from the NIR image to generate the NIR detail layer image.

3. The device of claim 1, wherein the image decomposer performs low-pass filtering on the RGB image using a Gaussian filter to generate the RGB base layer image and subtracts the RGB base layer image from the RGB image to generate the RGB detail layer image.

4. The device of claim 1, wherein the similarity decreases and the mixing weight value increases as an amount of haze in the RGB image increases, the mixing weight value corresponding to a ratio of mixing the NIR detail layer image with the RGB detail layer image.

5. The device of claim 1, wherein
the RGB image includes a red (R) image, a green (G) image and a blue (B) image,
the similarity includes an R similarity between the HF components of the NIR image and the R image, a G similarity between the HF components of the NIR image and the G image, and a B similarity between the HF components of the NIR image and the B image, and
the mixing weight value includes an R mixing weight value corresponding to the R similarity, a G mixing weight value corresponding to the G similarity, and a B mixing weight value corresponding to the B similarity.

6. The device of claim 5, wherein
the R similarity corresponds to an area of a region of a histogram of the HF component of the NIR image that overlaps a histogram of the HF component of the R image,
the G similarity corresponds to an area of a region of the histogram of the HF component of the NIR image that overlaps a histogram of the HF component of the G image, and
the B similarity corresponds to an area of a region of the histogram of the HF component of the NIR image that overlaps a histogram of the HF component of the B image.

7. The device of claim 5, wherein the R similarity, the G similarity and the B similarity are equal to each other when the RGB image does not include haze, and
wherein, when an amount of haze in the RGB image increases, the G similarity decreases more rapidly than the R similarity, the B similarity decreases more rapidly than the G similarity, the G mixing weight value increases more rapidly than the R mixing weight value, and the B mixing weight value increases more rapidly than the G mixing weight value.

8. The device of claim 1, wherein
the NIR image is divided into first through Nth NIR patches wherein N is a positive integer,
the RGB image is divided into first through Nth RGB patches,
the NIR detail layer image is divided into first through Nth NIR detail layer patches,
the RGB detail layer image is divided into first through Nth RGB detail layer patches,
the mixed RGB detail layer image is divided into first through Nth mixed RGB detail layer patches,
the mixing weight value includes first through Nth patch mixing weight values,
the similarity includes first through Nth patch similarities, and
the detail layer mixer mixes the Kth NIR detail layer patch and the Kth RGB detail layer patch based on the Kth patch mixing weight value to generate the Kth mixed RGB detail layer patch wherein K is a positive integer less than or equal to N.

9. The device of claim 8, wherein
the Kth RGB patch includes a Kth R patch, a Kth G patch and a Kth B patch,
the Kth patch similarity includes a Kth R patch similarity between the HF components of the Kth NIR patch and the Kth R patch, a Kth G patch similarity between the HF components of the Kth NIR patch and the Kth G patch, and a Kth B patch similarity between the HF components of the Kth NIR patch and the Kth B patch, and
the Kth patch mixing weight value includes a Kth R patch mixing weight value corresponding to the Kth R patch similarity, a Kth G patch mixing weight value corresponding to the Kth G patch similarity, and a Kth B patch mixing weight value corresponding to the Kth B patch similarity.

10. The device of claim 9, wherein
the Kth R patch similarity corresponds to an area of a region of a histogram of the HF component of the Kth NIR patch that overlaps a histogram of the HF component of the Kth R patch,
the Kth G patch similarity corresponds to an area of a region of a histogram of the HF component of the Kth NIR patch that overlaps a histogram of the HF component of the Kth G patch, and
the Kth B patch similarity corresponds to an area of a region of a histogram of the HF component of the Kth NIR patch that overlaps a histogram of the HF component of the Kth B patch.

11. The device of claim 9, wherein
the weight generator outputs a value obtained by subtracting the Kth patch similarity from 1 as the Kth patch mixing weight value when a sum of absolute values of the HF components of the Kth NIR patch is greater than or equal to a sum of absolute values of the HF components of the Kth RGB patch, and
the weight generator outputs 0 as the Kth patch mixing weight value when the sum of the absolute values of the HF components of the Kth NIR patch is less than the sum of the absolute values of the HF components of the Kth RGB patch.

12. The device of claim 9, wherein
the weight generator outputs a value obtained by subtracting the Kth patch similarity from 1 as a Kth temporary weight value when a sum of absolute values of the HF components of the Kth NIR patch is greater than or equal to a sum of absolute values of the HF components of the Kth RGB patch,
the weight generator outputs 0 as the Kth temporary weight value when the sum of the absolute values of the HF components of the Kth NIR patch is less than the sum of the absolute values of the HF components of the Kth RGB patch, and
the weight generator generates the Kth patch mixing weight value by compensating the Kth temporary weight value wherein a boundary between the first through Nth mixed RGB detail layer patches becomes similar to a boundary between the first through Nth RGB patches.

13. The device of claim 12, wherein the weight generator generates the Kth patch mixing weight value by compensating the Kth temporary weight value by guided filtering, joint bilateral filtering or a Laplacian matrix wherein the boundary between the first through Nth mixed RGB detail layer patches becomes similar to the boundary between the first through Nth RGB patches.

14. The device of claim 8, wherein
the RGB base layer image is divided into first through Nth RGB base layer patches and the compensated RGB base layer image is divided into first through Nth compensated RGB base layer patches, and
the base layer dehazer extracts a Kth transmission coefficient that corresponds to a minimum value of a plurality of the pixel data included in the Kth RGB base layer patch and compensates the Kth RGB base layer patch based on the Kth transmission coefficient to output the Kth compensated RGB base layer patch.

15. The device of claim 14, wherein the output RGB image is divided into first through Nth output RGB patches, and
the adder adds the Kth mixed RGB detail layer patch and the Kth compensated RGB base layer patch to generate the Kth output RGB patch.

16. A device for removing haze from an image, comprising:
an image decomposer that decomposes an RGB image to generate an RGB detail layer image and an RGB base layer image;
a weight generator that generates a mixing weight value based on a similarity between high frequency (HF) components of an R image and a GB image included in the RGB image;
a detail layer mixer that mixes an R detail layer image included in the RGB detail layer image and a GB detail layer image included in the RGB detail layer image based on the mixing weight value to generate a mixed RGB detail layer image;
a base layer dehazer that removes haze from the RGB base layer image to generate a compensated RGB base layer image; and
an adder that adds the mixed RGB detail layer image and the compensated RGB base layer image to generate an output RGB image, wherein the output RGB image is free of haze.

17. The device of claim 16, wherein the similarity decreases and the mixing weight value increases as an amount of haze in the RGB image increases, the mixing weight value corresponding to a ratio of mixing the R detail layer image with the GB detail layer image.

18. A computer-implemented method for removing haze from an image, the method performed by the computer comprising the steps of:
decomposing a near-infrared (NIR) image to generate an NIR detail layer image and decomposing an RGB image to generate an RGB detail layer image and an RGB base layer image;
generating a mixing weight value based on a similarity between high frequency (HF) components of the NIR image and the RGB image;
mixing the NIR detail layer image and the RGB detail layer image based on the mixing weight value to generate a mixed RGB detail layer image;
removing haze from the RGB base layer image to generate a compensated RGB base layer image; and
adding the mixed RGB detail layer image and the compensated RGB base layer image to generate an output RGB image, wherein the output RGB image is free of haze.

19. The method of claim 18, wherein decomposing the near-infrared (NIR) image comprises performing low-pass filtering on the NIR image using a Gaussian filter to generate an NIR base layer image and subtracting the NIR base layer image from the NIR image to generate the NIR detail layer image, and
decomposing the RGB image comprises performing low-pass filtering on the RGB image using a Gaussian filter to generate the RGB base layer image and subtracting the RGB base layer image from the RGB image to generate the RGB detail layer image.

20. The method of claim 18, wherein the similarity decreases and the mixing weight value increases as an amount of haze in the RGB image increases, the mixing weight value corresponding to a ratio of mixing the NIR detail layer image with the RGB detail layer image.

* * * * *